Patented Apr. 3, 1928.

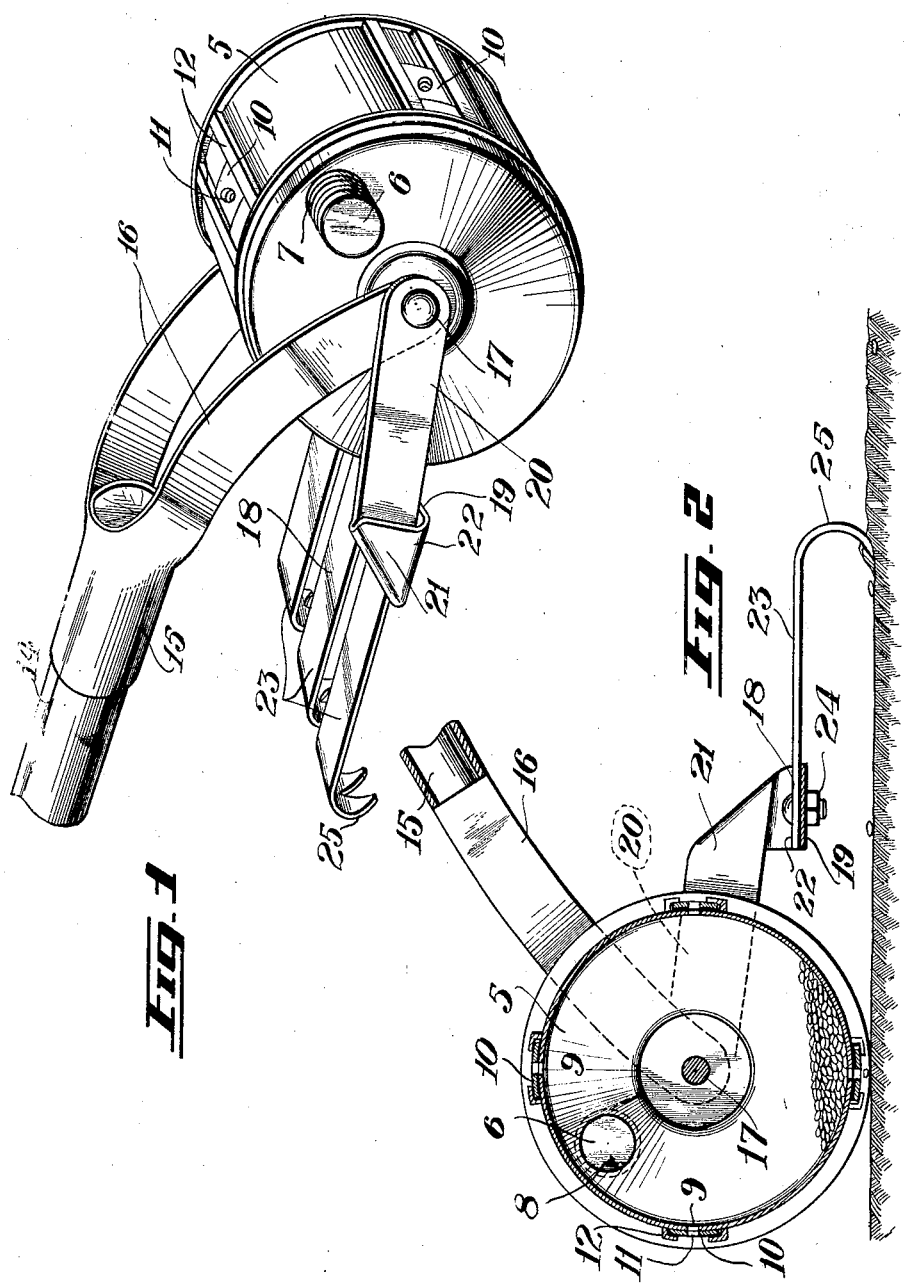

1,665,042

UNITED STATES PATENT OFFICE.

TEMPLE RICHARDS, OF GLACE BAY, NOVA SCOTIA, CANADA.

SEEDER.

Application filed May 18, 1926. Serial No. 109,910.

This present invention relates to improvements in a seeder and appertains particularly to a device of this character whose principal object is to deposit and suitably cover the seeds as the implement is advanced over the ground.

A further object is to provide a hand seeder of the character described, provided with means to cover the seeds when so deposited.

A further object is the provision of a seeder as described that will save time and labor is easily operated and will be found efficient in use.

A still further object is the provision of a seeder as set forth wherein the number of parts are few, the construction simple and the cost of production relatively low, the same being thereby rendered commercially desirable.

To the accomplishment of these and related objects that may become apparent, the invention resides in the construction, combination and arrangement of parts as shall be hereinafter more fully described, illustrated in the accompanying drawings and pointed out in the claims hereunto appended.

The invention will be best understood and can be most clearly described when reference is had to the attached drawings forming a part of this disclosure and in which, Fig. 1 is a perspective view of the improved seeder, and Fig. 2 is a detail transverse section therethrough, showing the device in operation.

Particular reference is now had to these drawings, wherein like characters indicate like parts throughout the views, the numeral 5 designating the seed containing drum having a screw cap 6, for filling purposes, threaded to the flange 7 of an opening 8 in one end.

Radial openings 9 occur at spaced intervals about the circumference of this drum 5 having closure caps 10 with perforations 11 adapted to be brought into registering with said openings 9. These caps 10 slide transversely of the drum 5, parallel with its axis, between the inwardly flanged guides 12 being frictionally held thereby in any desired position. The bringing of the perforations in the caps 10 into only partial registry with the drum openings 9 obviously constricts the size of the seed outlet thus afforded, while the shutting off of the outlet is accomplished by moving the openings and perforations entirely out of registry. It will thus be seen that the flow of various sized seeds can be properly controlled by regulating the size of the outlet afforded by the more or less registering holes. In the present illustrations, I have shown four outlets circumferentially about the drum, though any desired size of drum with any number of openings may be used, and so it will be seen that the spacing of the seeds dropped from the drum may also be regulated by the manipulation of these closure caps 10, for on each rotation of the drum the seeder is advanced a distance equal to the circumference of the drum in which distance or during which rotation, with the design of seeder shown, one, two, or four seeds may be dropped at evenly spaced distances by closing all but one outlet, alternate outlets, or by leaving all the outlets open, as required respectively.

This drum 5 is rolled along over the prepared field by a handle member 14 united therewith by a bifurcated ferrule 15 whose arms 16 are connected axially, to the drum ends with suitable bearings 17. These axially aligned bearings serve also to support a trailing element 18.

This trailing element is, in the present instance, in the form of a seed covering medium, though a weighted roller or both may quite satisfactorily be employed. Here the trailing element comprises a body 19 formed of a strip of sheet metal whose ends 20 are doubled back on itself diagonally as at 21, to lie at right angles in the same plane, and then bent vertically just within the diagonal fold 21, as at 22, into a plane at right angles to the body. These vertical ends 20 are embraced as hereinbefore described by the bearings 17, thereby connecting the same to the drum 5, the body 19 being disposed horizontally and extending transversely of the drum. To this horizontal body, seed covering tines 23 are secured, as by the nut and bolt 24, terminating in a downwardly bent forked tooth 25 designed to straddle the line on which the seeds are being dropped to fill the soil in over the deposited seeds. Three such tines are illustrated, in spaced relation, though only one is necessary when but a single circumferential row of openings are provided in the drum, consequently it is assumed that instead of individual openings occuring at spaced intervals about the circumference of the drum, a number of such openings, suitably spaced in transverse alignment, may be included thereby enabling the device to seed a number of rows at a time.

From the foregoing description taken in connection with the accompanying drawings, it will be manifest that a seeder is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:—

1. Seed covering devices for a seeder including the combination with the seeder axle, of a body formed of a strip of metal having its ends doubled back on itself diagonally to lie at right angles in the same plane, and then bent vertically, just within the diagonal fold, into a plane at right angles to the body; the said ends of the body being mounted on the ends of the seeder axle; and a rearwardly extending tine carried on the said body.

2. In combination with a rotatable seed depositing body, a trailing seed covering device including a transverse body strip having its ends bent upon itself and extended forwardly for mounting on the ends of the seeder axle carrying the seeder hopper and the seeder handle; and a plurality of tines extended rearwardly from the said body strip and having downwardly curved bifurcated free ends.

Signed at Glace Bay, in the county of Cape Breton and Province of Nova Scotia, this 27th day of April, A. D. 1926.

TEMPLE RICHARDS.